United States Patent
Loehr et al.

(10) Patent No.: US 10,263,976 B2
(45) Date of Patent: Apr. 16, 2019

(54) METHOD FOR EXCLUDING A PARTICIPANT FROM A GROUP HAVING AUTHORIZED COMMUNICATION

(71) Applicant: Robert Bosch GmbH, Stuttgart (DE)

(72) Inventors: Hans Loehr, Stuttgart (DE); Jan Zibuschka, Magstadt (DE); David Foerster, Ditzingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 291 days.

(21) Appl. No.: 15/138,058

(22) Filed: Apr. 25, 2016

(65) Prior Publication Data

US 2016/0330194 A1 Nov. 10, 2016

(30) Foreign Application Priority Data

May 5, 2015 (DE) .......................... 10 2015 208 293

(51) Int. Cl.
*H04L 29/06* (2006.01)
(52) U.S. Cl.
CPC ........ *H04L 63/0823* (2013.01); *H04L 63/104* (2013.01)
(58) Field of Classification Search
CPC ........................ H04L 63/0823; H04L 63/104
See application file for complete search history.

(56) References Cited

U.S. PATENT DOCUMENTS

| | | | | |
|---|---|---|---|---|
| 8,090,949 B2* | 1/2012 | Bellur | ................... | H04L 9/3268 700/200 |
| 9,525,556 B2* | 12/2016 | Park | ........................ | H04L 67/12 |
| 9,769,658 B2* | 9/2017 | Dolev | .................... | H04W 12/06 |
| 2011/0083011 A1* | 4/2011 | DiCrescenzo | .......... | H04L 9/006 713/158 |
| 2013/0080360 A1* | 3/2013 | Sterritt | .................... | G05B 13/02 706/14 |
| 2015/0256347 A1* | 9/2015 | Tseng | .................... | H04L 9/3265 713/158 |

OTHER PUBLICATIONS

Stumpf et al., "Trust, Security and Privacy in VANETs—A Multilayered Security Architecture for C2C-Communications", pp. 1-14, VDI-Verlag, 2007 (also reported on IDS filed on Apr. 25, 2016). (Year: 2007).*

Raya, M. et al., "Eviction of misbehaving and faulty nodes in vehicular networks", IEE E Journal on Selected Areas in Communication, vol. 25, No. 8, Oct. 2007, pp. 1557-1568.

Stumpf, F., et al., Trust, security and privacy in vanets a multilayered security architecture for C2C-Communication, VDI Berichte, 2016, pp. 55-70.

* cited by examiner

*Primary Examiner* — Eleni A Shiferaw
*Assistant Examiner* — Hee K Song
(74) *Attorney, Agent, or Firm* — Norton Rose Fulbright US LLP; Gerard Messina

(57) ABSTRACT

A method for excluding a participant from a group of multiple participants, in which certificates are used for an authorized communication of the participants among each other, a withdrawal request being received by one participant of the group, the withdrawal request making an identification of the participant to be excluded possible by the participant to be excluded itself, and the authorized communication being terminated by the participant when it is identifiable as the participant to be excluded based on the withdrawal request, as well as a communication system for carrying it out.

25 Claims, 2 Drawing Sheets

METHOD FOR EXCLUDING A PARTICIPANT FROM A GROUP HAVING AUTHORIZED COMMUNICATION

CROSS REFERENCE

The present application claims the benefit under 35 U.S.C. § 119 of German Paetnt Application No. DE 10 2015 208 293.8 filed on May 5, 2015, which is expressly incorporated herein by reference in its entirety.

FIELD

The present invention relates to a method for excluding a participant from a group of multiple participants, in which certificates are used for an authorized communication of the participants among each other, as well as a processing unit, a communication system and a computer program for carrying out the method.

BACKGROUND INFORMATION

In mobile ad hoc networks, participants may communicate with other participants in their surroundings. For example, they may be vehicles in so-called vehicular ad hoc networks (VANET, also car-to-car or car-to-X). To limit the number of participants, all authorized participants may receive an authorization certificate. For data protection reasons, participants may also receive multiple so-called pseudonymous certificates, which for example, may be derived from an, in particular, anonymous authorization certificate which has been valid, for example, for a longer time or is more technically complex. However, the pseudonymous certificates may also be requested periodically or as needed from a certification authority, the authorization being verified, for example, by an initial certificate or another method.

For a preferably optimal data protection, these pseudonymous certificates may be issued in such a way that no attribution to the owner and vice versa is possible.

However, for example, improper conduct of a participant may make it desirable or necessary to exclude this participant from the communication system.

SUMMARY

In accordance with the present invention, a method for excluding a participant as well as a processing unit, a communication system and a computer program for carrying it out are provided. Advantageous embodiments are described below.

A method according to an example embodiment of the present invention is used for excluding a participant from a group of multiple participants, in which certificates are used for an authorized communication of the participants among each other. Here, a withdrawal request is received by a participant of the group, the withdrawal request making an identification of the participant to be excluded by the participant to be excluded possible (and in particular only by this participant). In particular, the participant to be excluded may be identified by identifying a certificate used by the participant to be excluded. The withdrawal request is transmitted in particular by a certification authority, which is in particular also responsible for issuing or signing the certificates. The authorized communication is terminated by the participant when it is identifiable as a participant to be excluded based on the withdrawal request.

This makes it possible to exclude a participant in a communication system which, for example has improperly used its certificate, even if it is not possible to identify the relevant participant on the basis of the improperly used certificate. This is the case when, for example, the participants in a communication system do in fact use certificates for data protection reasons; however, these certificates are, for example, generated from an initial key or special certificate in order to limit the recognizability. This generation may be carried out by the user or a third party. Alternatively, the certificates may also be issued by a third party, the authorization for receiving these certificates being verified by the initial certificate. A connection between a use of the relevant certificate by the participant and the underlying initial key or certificate or the participant responsible for it is at least not obvious from outside. It may thus be prevented, for example, that a participant may be pursued based on the certificates used by it. A participant which receives a withdrawal request, may use it to check if it is the participant to be excluded. If this is the case, the relevant participant may terminate its authorized communication. Since preferably only the participant to be excluded itself and no other participant is able to identify that it is the participant to be excluded, anonymity is preserved.

Within the scope of the present invention, for example, by transmitting the withdrawal request to multiple participants, among which the participant to be excluded is present or at least should be present, the relevant participant may be excluded without a connection between the relevant participant and the improperly used certificate being known or needing to be established, i.e., without a violation of data protection. In particular, this method may thus be combined with particularly privacy-friendly methods for issuing the certificates, in which it is technically impossible to establish a connection between the transmitted certificates and the identity of the participant.

The communication within the communication system may occur via a communication medium such as, for example, mobile radio, in the case of vehicles (car-to-car), in particular also in combination with other traffic systems (car-to-X), also via WLAN using ITS-G5 or the like. In this case, it is possible that the communication occurs from point to point between two participants each, and that one participant sends messages to groups of other participants. In particular, the withdrawal request may for that reason also be transmitted via this communication medium.

Advantageously, the termination of the authorized communication is forced or monitored by a trustworthy component, via which the integrity of the participant may be safeguarded, or is in particular actually safeguarded. A trustworthy component is a component which is able to safeguard the integrity of the system, and its measurements for that purpose are difficult to manipulate, since it has at its disposal special protective measures that make a manipulation difficult or at least make it obvious, for example, in the form of a hardware and/or software component, for example a trusted platform module (TPM). Such components typically also contain a memory area which is protected against read-out, which contains cryptographic keys which the trustworthy component may use, for example, for signing messages.

The use of a trustworthy component for enforcing compliance with a withdrawal request is described, for example, in a paper by Raya, M., Papadimitratos, P., Aad, I., Jungeis, D., & Hubaux, J. P. (2007), Eviction of misbehaving and faulty nodes in vehicular networks, Selected Areas in Communications, IEEE Journal on, 25(8), 1557-1568. For this reason, it is, however, only possible to exclude known participants.

An exclusion of a participant using pseudonymous certificates is describe in a paper by Stumpf, F., Fischer, L, & Eckert, C. (2007), Trust, security and privacy in vanets a multilayered security architecture for c2c-communication. VDI BERICHTE, 2016, 55. However, it also necessary in this case to identify the owner for each pseudonymous certificate.

Preferably, for the identification of the participant to be excluded, the withdrawal request includes a certificate used by the participant to be excluded and/or a code from which the certificate may be ascertained, in particular only by the participant to be excluded. If the withdrawal request itself includes the certificate, the participant to be excluded is able to recognize very easily that it is required to terminate its authorized communication. If the withdrawal request includes a code, from which the certificate may be ascertained in particular only by the participant to be excluded, it is possible for a participant to be able to ascertain if it is the participant to be excluded, even if it has already, for example, deleted the relevant certificate. For this purpose, the code may be, for example a so-called revocation token, which is encoded in the certificate when it is issued. For example, the token may be generated via an encryption method, for example a randomized encryption, which uses, for example, an initialization vector, which only the owner of the certificate is able to decrypt.

Preferably, an authenticity of the withdrawal request is verified, in particular by a third party such as the certification authority. This may be carried out, for example, with the aid of a signature. In this way, it may be ensured that the withdrawal request to the relevant participant is actually desired by a party authorized for that purpose or is necessary.

Advantageously, the withdrawal request is transmitted to all participants of the group or to a selected part of the participants of the group, in particular based on a geographic region. If the withdrawal request is transmitted to all participants of the group, it may be ensured that the participant to be excluded also receives the withdrawal request.

If, however, it may be ensured, or at least assumed to a high degree of probability, that the participant to be excluded is located within a part of the group, the transmission of the withdrawal request may also be limited to this part, resulting in a saving of resources. Such a part of a group may be, for example, participants in a certain geographic region. If the participants are, for example, vehicles, the region may include a city or a section of freeway. The message may be distributed, for example, with the aid of Geocast or multi-hop communication. The message may also be restricted to a predefined locally limited area in order to limit its range, or forwarded from participant to participant in order to increase its range. Combinations of the two methods are possible, for example, if the natural range of the message is significantly smaller than the locally limited area.

It is advantageous if the termination of the authorized communication includes a deletion of the certificate used by the participant to be excluded and in particular additional certificates of the participant to be excluded and/or keys belonging to the certificates. In this way, a restart of the authorized communication using the relevant certificate or using other certificates still held by the participant to be excluded may be prevented. A restart may consequently only occur if authorized communication is again allowed for the relevant participant by the granting of new certificates.

Preferably, the termination of the authorized communication includes a confirmation by the participant to be excluded, in particular to the sender of the withdrawal request. The sender of the withdrawal request is usually the certification authority. This, for example, may make it possible to avoid an unnecessary or repeated transmission of the withdrawal request.

Advantageously, means for checking and/or confirming the receipt of the withdrawal request by the participant to be excluded are preserved after termination of the authorized communication. Thus, in the case of an additional withdrawal request based on an additional certificate, the receipt of this withdrawal request may also be confirmed.

It is advantageous if safety measures are carried out by the participant to be excluded after termination of the authorized communication. If the participant is, for example, a vehicle, the safety measures may include, for example, a prompt to the driver to visit a repair shop, a limitation of the maximum speed of the vehicle, a shutdown of the vehicle and/or a report of the vehicle's present position to, for example, a public authority. Such safety measures may in particular also be dependent on and/or occur depending on the type of improper use of the certificate. Moreover, the data protection of the relevant participant may, for example, be lifted. Overall, safety measures are consequently possible despite data protection, i.e., the absence of a connection between participant and certificate.

Preferably, a verification of the integrity of a participant takes place, in particular by verification in relation to one or multiple other participants of the group and/or in relation to a certification authority. In particular, this verification may be made with the aid of the trustworthy components. In this way, it may be ensured within the group or the entire communication system, that the relevant participant has also actually terminated its authorized communication.

Advantageously, the verification of the integrity of the participant takes place prior to the call of one or multiple new certificates and/or after receipt of the withdrawal request. It may thus be ensured, for example, that in the case of an improper use, a participant also reliably stops the authorized communication thus made possible before it receives new certificates.

The integrity may, for example, be verified with the aid of a so-called remote attestation. Based on a trustworthy component (mentioned at the outset), a measurement of various properties of the participant, the measurement being protected against manipulation, is carried out in this method. In order to ensure the high level of data protection made possible by the present invention, for example, all trustworthy components may be equipped with a uniform key for this purpose. However, since this is not a very robust approach, it may be advantageous, for example, to also use direct anonymous attestation (DAA), in which a third party (a so-called issuer) provides the keys in the trustworthy components, for example, after it has checked certain system properties, and it is possible for another party (the so-called verifier) to verify these properties using zero-knowledge proofs, without it being possible for the key or the trustworthy component or the participant to be recognized.

A processing unit according to the present invention as participant, for example, a control unit of a motor vehicle, is, in particular, programmed for carrying out a method according to the present invention.

A communication system according to the present invention includes a group of multiple participants and a certification authority and is configured for carrying out the method according to the present invention. In particular, both the participants and the certification authority may be present as the processing unit.

The implementation of the method in the form of a computer program is also advantageous, since it entails very low costs, in particular when an executing control unit is also used for other tasks and is therefore present anyway. Suitable data media for providing the computer program are, in particular, magnetic, optical and electrical memories, such as hard drives, flash memories, EEPROMs, DVDs, etc. A download of a program via computer networks (Internet, Intranet, etc.) is also possible.

Additional advantages and embodiments of the present invention arise from the description and the figures.

The present invention is depicted schematically in the drawings based on an exemplary embodiment and is described below with reference to the figures.

DETAILED DESCRIPTION OF EXAMPLE EMBODIMENTS

Figure 1:
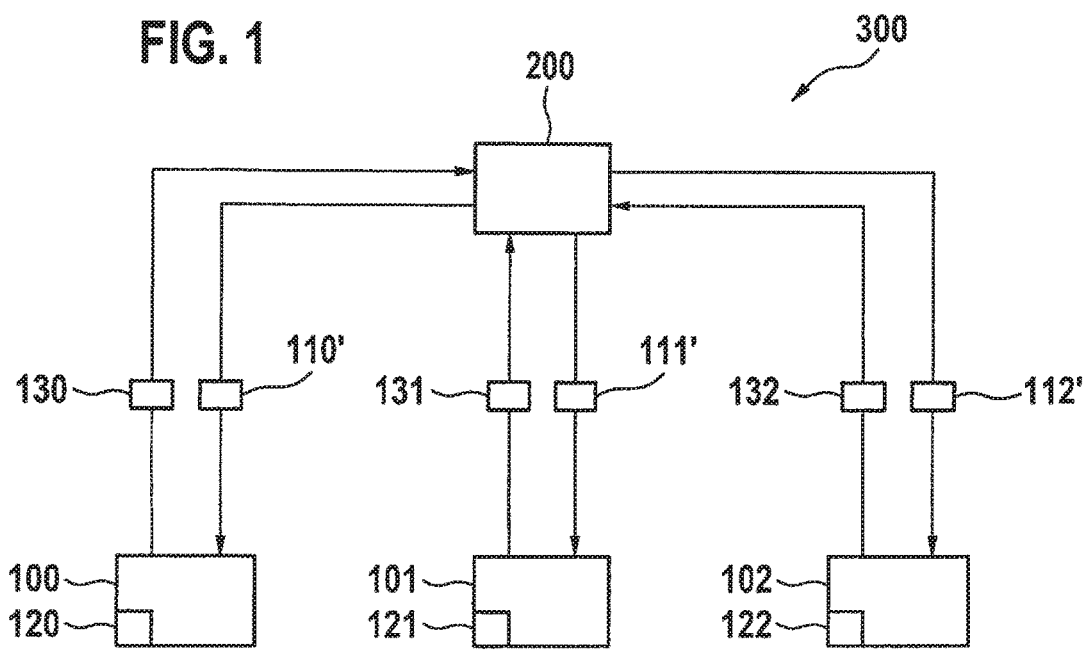
FIG. 1 schematically shows an assignment of certificates in a communication system according to the present invention in one preferred specific embodiment.

An assignment of certificates in a communication system 300 according to the present invention in one preferred specific embodiment is shown in FIG. 1. In the present case, the communication system includes, for example, three participants 100, 101 and 102. Here, it should be noted that the number of participants should actually amount to at least two; however, this is not otherwise relevant for the functionality of a method according to the present invention.

Three participants 100, 101 and 102 are each assigned an initial certificate 110', 111' and 112' by a certification authority 200. The particular assignment of these initial certificates may be preceded by a request for such an initial certificate by the particular participant, which is not shown here.

After receipt of the initial certificates, three participants 100, 101 and 102 each send a message 130, 131, and 132 to certification authority 200 as evidence of their integrity. The integrity of the particular participants is ensured by a trustworthy component 120, 121 and 122, which, for example, may be present as hardware and/or software components. For example, the initial certificates may also be stored in the particular trustworthy component.

From the initial certificate, each of participants 100, 101 and 102 may generate one or multiple certificates, which may subsequently be used for authorized communication. These certificates may be derived, for example, from the particular initial certificate with the aid of an encryption method, for example, using random numbers. There is no discernible connection of these derived certificates to the particular participant, so that the privacy of the particular participant is ensured in the use of these certificates. In this connection, these certificates are also denoted as so-called pseudonymous certificates.

It should be noted in this regard that instead of the method explained for obtaining certificates, other methods may also be used. Thus, for example, instead of the initial certificate, a key may be transmitted, from which certificates may in turn be ascertained. Alternatively, the certificates or pseudonymous certificates used for the communication may also be called by the certification authority, the authorization being verified by the initial certificate. In this case, it is also meaningful to verify the integrity prior to each call of such pseudonymous certificates.

Figure 2:
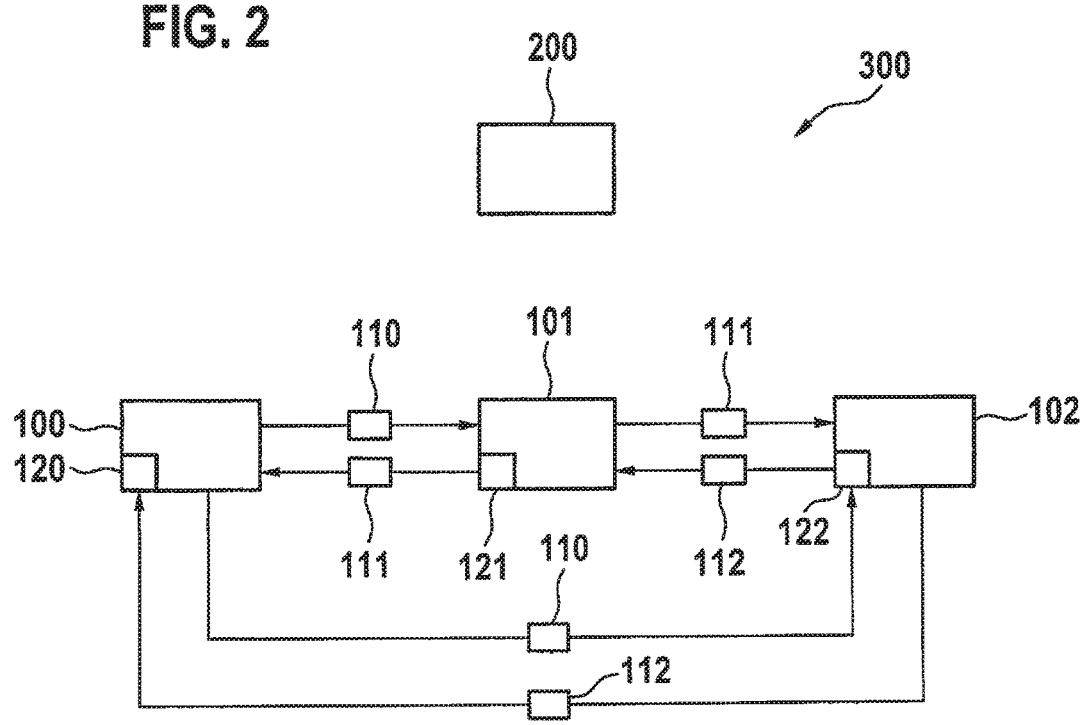
FIG. 2 schematically shows a communication among participants in a communication system according to the present invention in one preferred specific embodiment.

An authorized communication among three participants 100, 101 and 102 in communication system 300 is schematically shown in FIG. 2. For the authorized communication, the participants each use one of their certificates, which as explained above are derived, for example, from particular initial certificates 100', 101' and 102'. For example, the participants use only one certificate each; participant 100 uses certificate 110, participant 101 uses certificate 111 and participant 102 uses certificate 112. Using these certificates, the participants may, as shown, have authorized communication with each other.

Certificates 110, 111 and 112 are never transmitted in complete form from the particular participant to other participants. Only parts that are typically still being further processed are transmitted, for example, a signature derived from the private key. Furthermore, at least parts of the certificate (in particular the private key) are typically stored in the trustworthy component of the participant.

For the sake of completeness, it should be noted once more at this point that the use of a certificate by a participant verifies the authorization of the participant; however, it is not possible to infer the participant's identity from the certificate.

In the example shown, participant 101, which receives a message including a certificate 110, consequently knows that the sender is authorized for communication but not that the message originates from participant 100. The same applies to the additionally shown communication paths between the three participants.

Figure 3:
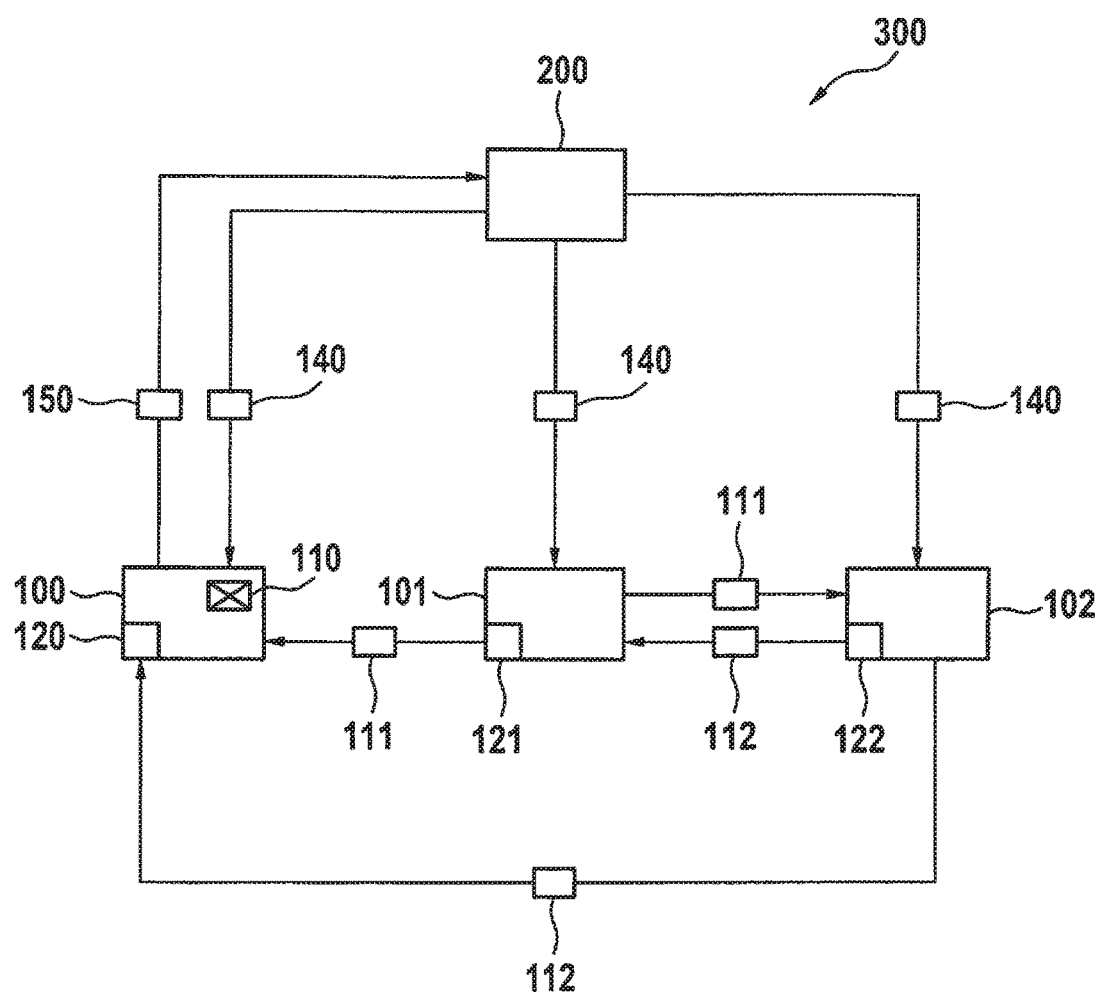
FIG. 3 schematically shows an exclusion of a participant in a communication system according to the present invention in one preferred specific embodiment based on a method according to the present invention in one preferred specific embodiment.

An exclusion of participant 100 in communication system 300 based on a method according to the present invention in one preferred specific embodiment is schematically shown in FIG. 3.

For this purpose, certification authority 200 sends a withdrawal request 140 to each of the three participants 100, 101 and 102. As mentioned at the outset, the withdrawal request may also be sent to only one part of the participants. If it is known, for example, that only participants 100 and 101 are located within a certain region in which improper use of certificate 110 was detected but participant 102 is not, it is sufficient if withdrawal request 140 is sent only to participants 100 and 101.

Withdrawal request 140 now makes it possible to identify certificate 110 used by the participant to be excluded. For this purpose, for example, certificate 110 itself may be contained in the withdrawal request. However, for example, initial certificate 110' may also be contained. Only participant 100 is able to recognize, based on withdrawal request 140, that it is the participant to be excluded.

Participant 100 subsequently terminates the authorized communication by deleting, for example, its certificate 110, which it would need for the authorized communication. In the present case, this is shown be a crossed out block 110. If present, additional certificates and/or keys needed for this purpose may also be deleted simultaneously. Subsequently, participant 100 sends a confirmation 150 to the certification authority that it has terminated the authorized communication and has also, for example, deleted the respective certificates.

While participant 100 is now no longer authorized for communicating in communication system 300, both participants 101 and 102 are able to continue authorized communication with one another. Trustworthy component 120 of participant 100 ensures that the communication is actually terminated. In particular, confirmation 150 may also be made by or with the participation of trustworthy component 120, which reenacts the integrity using manipulation-resistant measurements and confirms this measurement with the aid of a secret value protected against read-out.

What is claimed is:

1. A method for excluding a participant from a group of multiple participants, in which certificates are used for authorized communications of the participants among each other, the method comprising:
receiving by one of the participants of the group a withdrawal request, wherein the withdrawal request makes an identification of a first participant of the group to be excluded possible by the withdrawal request itself, the withdrawal request including at least one of: (i) a respective certificate previously used by the first participant, and (ii) a revocation token of the respective certificate previously used by the first participant; and
terminating the authorized communication of the first participant when the first participant is identifiable as a participant to be excluded based on the withdrawal request;
wherein, of the participants of the group, only the first participant is able to recognize from the withdrawal request that it is, itself, the participant to be excluded;
wherein the respective certificate previously used by the first participant is a respective pseudonymous certificate previously used by the first participant, wherein the respective pseudonymous certificate is a certificate generated by the first participant based on a respective initial certificate received from a certificate authority, the respective pseudonymous certificate being derived based on the respective initial certificate using an encryption method, the respective pseudonymous certificate being used during authorized communications between the first participant and others of the participants and providing anonymity to the first participant with respect to the others of the participants during the authorized communications.

2. The method as recited in claim 1, wherein the termination of the authorized communication is forced or monitored by a trustworthy component, via which an integrity of the participant to be excluded may be ensured.

3. The method as recited in claim 2, wherein the trustworthy component is a trusted platform module of the first participant.

4. The method as recited in claim 1, wherein the withdrawal request is transmitted by a certification authority.

5. The method as recited in claim 1, wherein an authenticity of the withdrawal request is verified by a certification authority.

6. The method as recited in claim 1, wherein the withdrawal request is transmitted to one of: i) all participants of the group, or ii) to a selected part of the participants of the group on a geographic region.

7. The method as recited in claim 1, wherein the termination of the authorized communication includes a deletion of at least one of: i) the certificate used by the participant to be excluded, ii) additional certificates of the participant to be excluded, and iii) keys belonging to the certificates.

8. The method as recited in claim 1, wherein the termination of the authorized communication includes a confirmation by the participant to be excluded.

9. The method as recited in claim 1, wherein the termination of the authorized communication includes a confirmation to the sender of the withdrawal request.

10. The method as recited in claim 1, wherein means for checking or confirming a receipt of the withdrawal request by the participant to be excluded are preserved after termination of the authorized communication.

11. The method as recited in claim 1, wherein safety measures are carried out by the participant to be excluded after termination of the authorized communication.

12. The method as recited in claim 1, wherein a verification of the integrity of a participant takes place by verification in relation to at least one of: i) one or multiple other participants of the group, and ii) a certification authority.

13. The method as recited in claim 12, wherein the verification of the integrity of the participant takes place at least one of: i) prior to the call of one or multiple new certificates, and ii) after receipt of the withdrawal request.

14. The method as recited in claim 1, wherein the withdrawal request includes the respective certificate previously used by the first participant.

15. The method as recited in claim 1, wherein the withdrawal request includes the respective pseudonymous certificate previously used by the first participant.

16. The method as recited in claim 1, wherein the receiving of the withdrawal request by the first participant is via at least one of mobile radio communication and WLAN.

17. The method as recited in claim 1, wherein the terminating includes deleting, by the first participant, the respective certificate previously used by the first participant.

18. A processing unit including hardware which is configured to exclude a participant from a group of multiple participants, in which certificates are used for authorized communications of the participants among each other, the processing unit configured to:
receive by one of the participants of the group a withdrawal request, wherein the withdrawal request makes an identification of a first participant of the group to be excluded possible by the withdrawal request itself, the withdrawal request including at least one of: (i) a respective certificate previously used by the first participant, and (ii) a revocation token of the respective certificate previously used by the first participant; and
terminate the authorized communication of the first participant when the first participant is identifiable as a participant to be excluded based on the withdrawal request;
wherein, of the participants of the group, only the first participant is able to recognize from the withdrawal request that it is, itself, the participant to be excluded;
wherein the respective certificate previously used by the first participant is a respective pseudonymous certificate previously used by the first participant, wherein the respective pseudonymous certificate is a certificate generated by the first participant based on a respective initial certificate received from a certificate authority, the respective pseudonymous certificate being derived based on the respective initial certificate using an encryption method, the respective pseudonymous certificate being used during authorized communications between the first participant and others of the participants and providing anonymity to the first participant with respect to the others of the participants during the authorized communications.

19. The processing unit as recited in claim 18, wherein the withdrawal request includes the respective certificate previously used by the first participant.

20. A communication system including a group of multiple participants and including a certification authority, each of the participants and the certification authority including hardware, wherein at least one of the participants of the group receives a withdrawal request, and the withdrawal request makes an identification of a first participant of the group to be excluded possible by the withdrawal request itself, the withdrawal request including at least one of: (i) a respective certificate previously used by the first participant, and (ii) a revocation token of the respective certificate previously used by the first participant, and the authorized communication of the first participant is terminated when the first participant is identifiable as a participant to be excluded based on the withdrawal request; wherein, of the participants of the group, only the first participant is able to recognize from the withdrawal request that it is, itself, the participant to be excluded:
wherein the respective certificate previously used by the first participant is a respective pseudonymous certificate previously used by the first participant, wherein the respective pseudonymous certificate is a certificate generated by the first participant based on a respective initial certificate received from a certificate authority, the respective pseudonymous certificate being derived based on the respective initial certificate using an encryption method, the respective pseudonymous certificate being used during authorized communications between the first participant and others of the participants and providing anonymity to the first participant with respect to the others of the participants during the authorized communications.

21. The communication system as recited in claim 20, wherein the withdrawal request includes the respective certificate previously used by the first participant.

22. A non-transitory computer-readable storage medium storing a computer program for performing a method for excluding a participant from a group of multiple participants, in which certificates are used for authorized communications of the participants among each other, the program, when executed by a processing unit, causing the processing unit to perform:
receiving by one of the participants of the group a withdrawal request, wherein the withdrawal request makes an identification of a first participant of the group to be excluded possible by the withdrawal request itself, the withdrawal request including at least one of: (i) a respective certificate previously used by the first participant, and (ii) a revocation token of the respective certificate previously used by the first participant; and
terminating the authorized communication of the first participant when the first participant is identifiable as a participant to be excluded based on the withdrawal request;
wherein, of the participants of the group, only the first participant is able to recognize from the withdrawal request that it is, itself, the participant to be excluded;
wherein the respective certificate previously used by the first participant is a respective pseudonymous certificate previously used by the first participant, wherein the respective pseudonymous certificate is a certificate generated by the first participant based on a respective initial certificate received from a certificate authority, the respective pseudonymous certificate being derived based on the respective initial certificate using an encryption method, the respective pseudonymous certificate being used during authorized communications between the first participant and others of the participants and providing anonymity to the first participant with respect to the others of the participants during the authorized communications.

23. The non-transitory computer-readable storage medium as recited in claim 22, wherein the withdrawal request includes the respective certificate previously used by the first participant.

24. A method for excluding a participant from a group of multiple participants, in which certificates are used for authorized communications of the participants among each other, the method comprising:
receiving by one of the participants of the group a withdrawal request, wherein the withdrawal request makes an identification of a first participant of the group to be excluded possible by the withdrawal request itself, the withdrawal request including at least one of: (i) a respective certificate previously used by the first participant, and (ii) a revocation token of the respective certificate previously used by the first participant; and
terminating the authorized communication of the first participant when the first participant is identifiable as a participant to be excluded based on the withdrawal request;
wherein, of the participants of the group, only the first participant is able to recognize from the withdrawal request that it is, itself, the participant to be excluded;
wherein the respective certificate previously used by the first participant is a respective pseudonymous certificate previously used by the first participant, wherein the respective pseudonymous certificate is a certificate generated by the first participant based on a key, the respective pseudonymous certificate being used during authorized communications between the first participant and others of the participants and providing anonymity to the first participant with respect to the others of the participants during the authorized communications.

25. The method as recite in claim 24, wherein the withdrawal request includes the respective pseudonymous certificate previously used by the first participant.

* * * * *